United States Patent Office 3,538,561
Patented Nov. 10, 1970

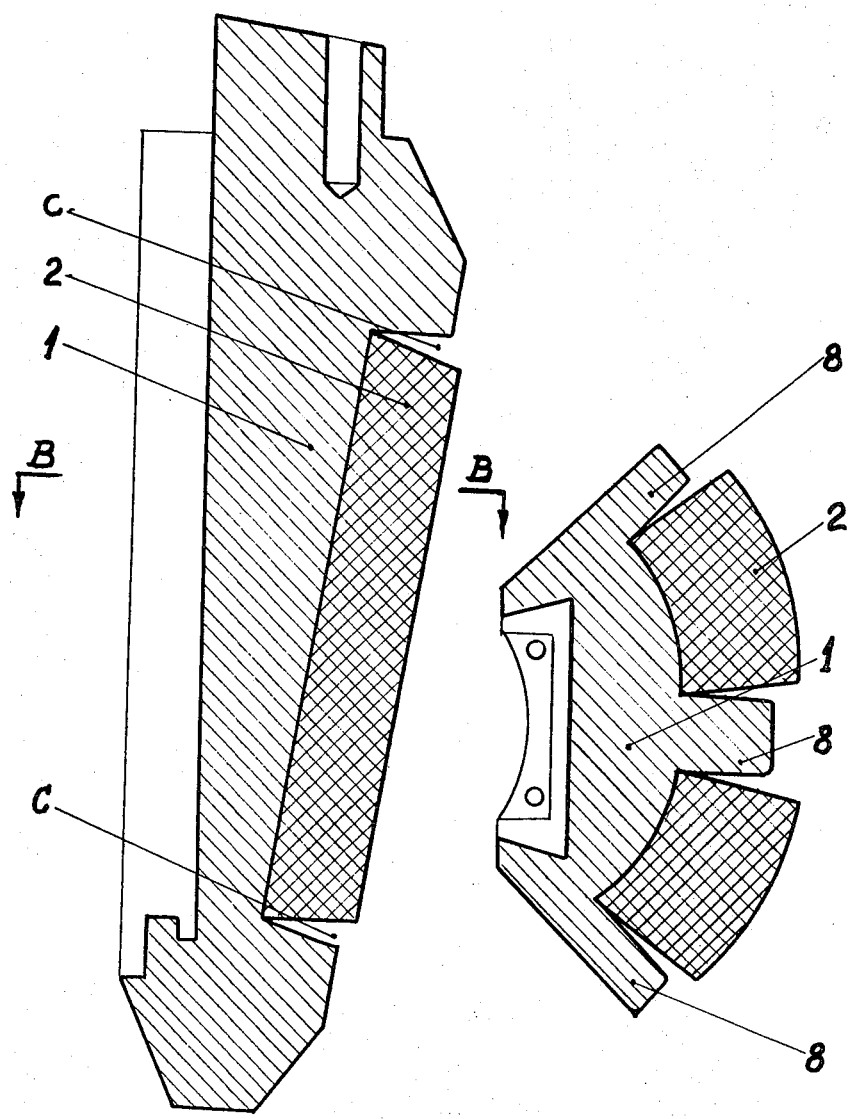

3,538,561
ELASTIC FIXING WEDGES
Eugeniu Vasile Anastasiu and Traian Margarit, Bucharest, Rumania, assignors to Institut Proiectare si Cercetare pt. Utilaj Petrolier, Bucharest, Rumania, a corporation of Rumania
Filed Apr. 16, 1969, Ser. No. 816,659
Claims priority, application Rumania, May 10, 1968, 56,681
Int. Cl. F16l 7/00
U.S. Cl. 24—263                              2 Claims

ABSTRACT OF THE DISCLOSURE

A wedge for releasably retaining tubular members at oil wells and the like. In the body of the wedge there is provided an elastic rubber layer or a layer of another synthetic material, pasted and vulcanized onto the body of the wedge, which is also provided with elements for maintaining the specific pressure on the elastic layer within allowable limits. In order to prevent sliding of the tubular material through the wedges if the elastic layer is destroyed, the conically shaped trunk or body of the wedge is provided with stopping thresholds, which prevent the movement of wedging elements to exceed predetermined longitudinal sliding tolerances and a radial deformation greater than a pre-established amount.

---

The invention relates to a wedge system for elastic wedging of tubular material manipulated in the drilling of wells.

A known method for securing tubular materials during operations at wells makes use of steel wedges with conically shaped trunks provided with a special tooth-arrangement for increasing friction at the contact surface of the wedges with the tubular material.

The method has the drawback that the wedging section is rigid and therefore contributes to the deterioration of the manipulated tubular material. With increasing depths, moreover, the harmful action of wedging becomes increasingly significant due to the continuously increasing of the weight of the drill string.

Also, a device is known for supporting the casing in the well. This device is provided with elastic elements of the spring type and with a system for the hydraulic damping of the impacts produced when the coupling is laid upon the surface of the sustaining device.

This device has the drawback that it is of complicated construction and the engagement of the tubular elements is limited to the coupling elements, e.g. the unions between the sections of the tubular member.

It is, therefore, the principal object of the instant invention to provide an improved system for securing tubular members at oil wells and the like.

The wedges, according to the invention, do away with the aforedescribed drawbacks by the fact that, in order to reduce the harmful effect of a sudden wedging and to assure an elastic wedging of the wedges, the metal wedge bodies are provided with a layer of rubber or a layer of another plastic material, pasted and vulcanized upon the concentric and coaxial surfaces of the wedges making through this elastic layer, both parts of the wedges of the conical trunk part integral with the cylindrical part, the latter being provided with the fixing teeth engageable with the tubular material; in another embodiment, the elastic rubber layer is mounted in a recess at the outside surface of the conical trunk part, and the limiting of the specific pressure upon the elastic layer is assured by providing thresholds which after deformation of the elastic layer at a previously established value, become effective and impart to the wedge the behavior of an incompressible solid.

In order to eliminate the peril of slipping of the tubular material if the elastic layer is destroyed, the frusto-conical body of the wedge is provided with a stopping threshold which hinders the wedging element from surpassing a longitudinal axial slippage bigger than the distance between the wedging elements and the stopping threshold; the conical trunk part is made integral at the upper part of the wedging element with the aid of a system of screws and oval holes which assure a transversal degree of mobility larger than or at least equal to the elastic deformation of the rubber.

Thus the invention constitutes a wedge for the manipulation of a pipe of a drill string which includes a rigid slip body having means for assuring elastic wedging of the drill-pipe tubing manipulated at the well. The latter means comprises a plurality of arcuate elastically deformable means of rubber or a rubber-like material, preferably in the form of arcuate layers, longitudinally spaced from each other by rigid radially extending stop means and positioned internally of the wedge between a movably mounted toothed pipe-gripping means and an axially tapered bowl engaging surface on the body. The pipe-gripping means or body has a limited degree of axial movement as defined by stop means formed on the upper and lower edges of the slip body, the stop means defining with the bodies, chambers whose dimensions are larger than those of the elastically deformable layers or means to accommodate free expansion of the latter when they are deformed.

The invention is described in greater detail below with reference to the accompanying drawing in which:

FIG. 3 is a longitudinal section through a wedge provided with the elastic rubber layer upon its external surfaces; and FIG. 4 is a cross section along plane B—B of FIG. 3.

Figures 1, 2:
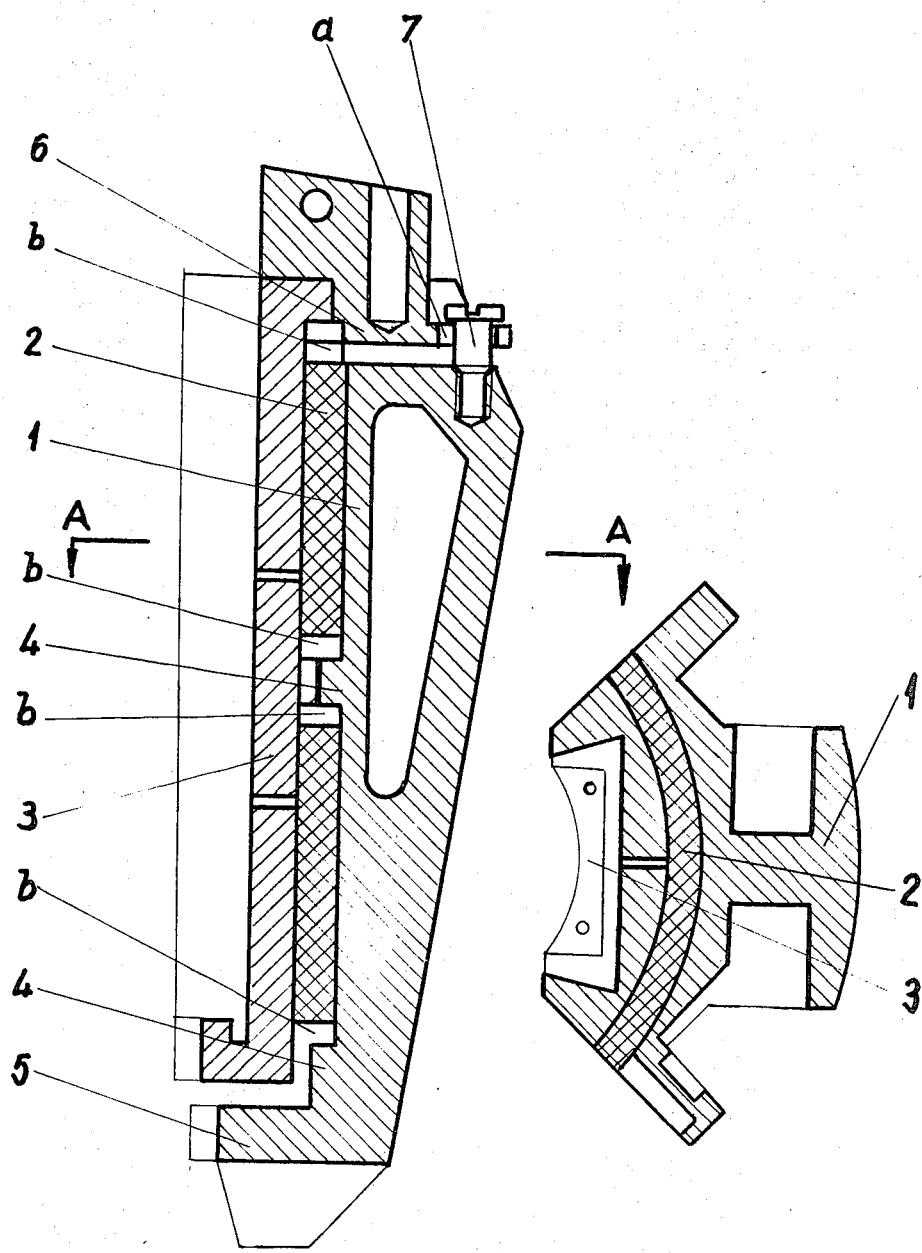
FIG. 1 is a longitudinal section through a wedge provided with an elastic rubber layer according to the invention.
FIG. 2 is a cross section through the system of FIG. 1 along plane A—A thereof.

The wedge of the present invention consists of a steel, generally conical trunk body 1, with a downward taper or inclination at its outside exterior surface 1g, and an inside surface parallel with the longitudinal axis of the wedge. Upon the inside surface, an elastic rubber body 2 is pasted by vulcanization, consisting of several elements separated by displacement joints b. The rubber body 2 is also pasted by vulcanization to an internal metallic part 3 on which the catcher blades of the wedge for engagement with the tubular material are mounted.

The strain in the rubber layer is assured to remain in allowable limits of rubber resistance by means of steps or thresholds 4, existing in the frusto-conical wedging body 1, upon which, after deformation of the rubber layer to a pre-determined value, seat the internal metallic parts 3, whereupon the wedge acts as a rigid body.

In order to assure limitation of axial displacement of the inside metallic parts 2, that in case that the rubber layer should be destroyed as a result of a construction defect or age of the rubber, the frusto-conical wedging body 1 is provided with a threshold or step 5, which prevents the inside metallic part 3 from coming out from its seat. At the upper end of the wedge the metallic inner part 3 is rigid with a connecting part 6 which is fixed on the frusto-conical wedging body 1 by means of an oval hole $a$ and a screw 6. Thus, the wedge can work elastically within the limits of the previously theoretical determined clearance for the rubber layer, after which operating is functionally rigid as with usual wedges.

In the embodiment of FIGS. 3 and 4 the elastic rubber or synthetic layer 2 is mounted on the exterior of the frusto-conical body 1 and is made rigid with it by pasting and vulcanizing.

The frusto-conical body 1 is provided with ribs 8 which limit the elastic deformation of the rubber 2 and from steps which cause the wedge to function as a rigid member at bigger strains.

The elastic rubber layer 2 is so dimensioned and is provided with working joints $c$ to allow deformation of the elastic elements in the determined limits.

What we claim is:

1. A wedge for use in the manipulation of a drill string at a drilled well, comprising:
    a rigid slip body with an axially tapering bowl surface;
    means on said body for elastically retaining pipe of said drill string and including a plurality of axially deformable arcuate layers longitudinally spaced apart in the direction of insertion of the wedge;
    a toothed pipe-gripping body movably mounted on said slip body, said layers being disposed between said pipe-gripping body and said surface;
    rigid radially extending stop means formed on at least one of said bodies between said layers for terminating radial movement of said pipe-gripping body toward said surface upon compression of said layers beyond a predetermined limit; and
    further stop means formed on an upper and a lower edge of said slip body for limiting axial and radial movement of said pipe-gripping body relative to said slip body, said stop means defining with said bodies chambers of larger dimensions than said elastically deformable layers into which said layers freely expand when deformed between said slip body and said pipe-gripping body.

2. An elastically deformable well-drilling wedge comprising:
    a slip body having a pair of arcuate externally positioned circumferentially spaced elastically deformable axially tapered bowl engaging means;
    radially extending rigid means formed integral with said body for limiting deformation of said deformable means; and
    rigid axially tapered means engageable with the bowl when said deformable means are suitably deformed during use, said rigid means defining with said body, chambers of larger dimensions than said deformable means into which said deformable means freely expands when deformed.

References Cited

UNITED STATES PATENTS

| | | |
|---|---|---|
| 1,923,283 | 8/1933 | Stokes. |
| 2,012,329 | 8/1935 | Wickersham et al. |
| 2,184,231 | 12/1939 | Allen. |
| 2,259,460 | 10/1941 | Dexter. |
| 3,127,198 | 3/1964 | Orund. |
| 3,052,943 | 9/1962 | Jones. |

FOREIGN PATENTS

| | | |
|---|---|---|
| 806,426 | 2/1952 | Germany. |

DONALD A. GRIFFIN, Primary Examiner